UNITED STATES PATENT OFFICE.

GIDEON E. MOORE, OF JERSEY CITY, NEW JERSEY, ASSIGNOR TO THE PASSAIC ZINC COMPANY.

IMPROVEMENT IN DISTILLING ZINC FROM ITS ORES.

Specification forming part of Letters Patent No. 170,760, dated December 7, 1875; application filed October 13, 1875.

*To all whom it may concern:*

Be it known that I, GIDEON EMMET MOORE, Ph. D., of Jersey City, in the county of Hudson and State of New Jersey, have made an invention of certain new and useful Improvements in the Art of Distilling Zinc from its Ores; and that the following is a full, clear, and exact description and specification of the same.

Metallic zinc is usually obtained from its ores by distillation; the ores being mixed with some carbonaceous material, and the mixture being subjected to heat in retorts, muffles, or crucibles, made of fire-clay, or of compounds thereof with other materials. In this process the zinc, existing in the ore in the form of oxide or other compound, is reduced to the metallic state, is vaporized, and is caused to pass over into a receiver, in which it collects, leaving in the retort a residuum, consisting mainly of slag or vitrified earthy matter. In the attempts which, previous to my invention, were made to treat by these means zinc ores, which are rich in manganese, the retorts were corroded by the action of the manganese upon them, and the corrosion took place so rapidly as to render the retorts unfit for use after a comparatively small number of operations, in some cases after only one; hence the expenditure for retorts was so great as to practically preclude the treatment of highly-manganiferous zinc ores by the process of dry distillation in earthen vessels.

The object of my invention is to prevent, in whole or in part, the corrosion of the distilling-vessels when the aforesaid ores are treated therein; and I have discovered that the excess of manganese liberated from the ore during the dry distillation of zinc can be taken up by the action of a quantity of iron, or of silica, or of iron and silica conjointly, supplementary to that existing in the zinc ore, and in the ashes of the coal-dust used as the reducing-agent, so as to prevent the corrosion of the distilling-vessels in whole or in part.

The zinc ores which I have treated successfully by my invention are those which consist of mixtures of the minerals Franklinite, Willemite, and Rhodonite; but the invention is not restricted to these particular zinc ores.

The mode in which I have practiced the invention with success is to mix with the ores to be treated such a quantity of iron as will form an alloy or compound with the excess of manganese of the zinc ore under the action of the heat, or such a quantity of silica as will form, with the excess of manganese, the compound known to chemists as the bisilicate of manganese, or such a quantity of iron and silica conjointly as will absorb the excess of manganese by converting a portion of it into an alloy or compound with the iron, and another portion of it into a bisilicate of manganese. The iron may be mixed with the zinc ores either in the form of scrap-iron, or in the form of a ferruginous ore, such, for example, as magnetic iron ore, or hematite, or in form of a product of the arts, such, for instance, as forge-scales and the roasted sulphuret of iron.

When silica is to be used, it may be most advantageously mixed with the manganiferous ores, either in the form of an ore of iron containing silica, or in the form of an ore of zinc containing a comparatively large quantity of silica.

The material or materials which are thus added to the manganiferous zinc ore I term, for distinction, "saturating materials," because their office is to saturate the excess of manganese existing in the manganiferous zinc ore, and thus prevent it from acting upon the material of the distilling-vessel.

As the metals exist in the ores in the form of oxides or other chemical compounds, there must be added to the mass to be distilled a sufficient quantity of carbonaceous material, such as coal-dust, to reduce the compounds to the metallic state.

The amount of carbonaceous material to be added for this purpose is well understood by metallurgists, and therefore it is not necessary to state any specific quantity of carbonaceous material. Usually a quantity equal to about one-third the weight of the mixture of ores to be distilled is sufficient.

The chemical constitution of different lots of the manganiferous ores of zinc varies almost indefinitely; hence it is not practicable within the limits of a specification of a patent to state the precise quantities of ferruginous or of silicious, or of silico-ferruginous materials, which are required for every particular mass of zinc ore to be treated. Moreover, some of the manganiferous zinc ores contain silica, which will take up a portion of the manganese in the process of distillation, and the silica which exists in the ashes of the coal used as the reducing-agent will take up a portion of the manganese, leaving only a portion to be taken up by the saturating ferruginous or silicious, or silico-ferruginous material to be added to the zinc ores. Hence the quantity of ferruginous, or silicious, or of silicious and ferruginous materials to be added should be determined for each class or lot of manganiferous zinc ores to be treated, from a preliminary analysis of the ore, and will depend upon the composition of the saturating material employed, and upon the quantities of iron, silica, and manganese contained in the manganiferous zinc ore.

In every case ferruginous or silicious materials, or both, are added in such quantity that, after deducting the amount of manganese requisite to form, with the non-reducible bases and silica in the charge, a silicate or slag sufficiently rich in silica to be devoid of corrosive action on the materials of which the retort or other distillatory apparatus is composed, the residue of manganese shall be completely reduced, and shall combine with the iron of the ferruginous matters in the charge to form a metallic alloy, as previously stated.

The silicate or slag mentioned in the preceding paragraph would necessarily vary in its ultimate constitution according to the nature of the bases present in the charge; but it may stated that practically good results have been attained when the slag contained sufficient silica to form with the bases in the charge the compounds known to chemists as "bisilicates;" or, in other words, compounds in which the amount of oxygen in the silica is double the amount of oxygen in the bases. Such a slag has been found to be entirely devoid of corrosive action on the distillatory apparatus, or sufficiently so for practical purposes.

And I may further add that I have found that ninety-one parts of iron will, under the circumstances as to temperature and intensity of reducing action obtaining during the ordinary distillation of zinc ores, take up and retain about four parts of metallic manganese reduced from the manganiferous ingredients of the charge; and, on the other hand, that eleven parts of pure silica will take up and retain about ten parts of manganese; and that whether the manganese be taken up by the action of iron alone, or by the action of silica alone, or by the action of the two conjointly, the practical result in either case is that the corrosive action of the charge upon the retort or other distillatory apparatus is effectually prevented. Iron and silica thus are substitutes, either for the other in practicing my process, or either one or the two conjointly may be used for the saturating material, as circumstances render expedient. In all cases, however, when ferruginous matter forms a constituent of the charge, the latter should contain enough silica to form a slag sufficiently fusible to permit the melted alloy or compound of iron manganese and carbon to collect in globules, and the slag must be of the character previously mentioned.

In proceeding to treat, according to my invention, any particular zinc ore whose characteristics are not known, it is expedient to determine by analysis the chemical composition of the ore. When this has been ascertained, the operator can determine approximately, by calculation based upon the above-stated results, what portion of the manganese in it will be taken up by the silica or iron, or both, which it contains, and what portion will be taken up by the silica of the ashes of the coal used as the reducing agent. The taking up of the residue of manganese must be provided for by the ferruginous or silicious or silicious and ferruginous material or materials which the operator has it in his power to add to the ore for that purpose, and the quantity of one or the other of these materials of known composition to be added can be calculated approximately from the capacity of iron and silica to take up manganese, according to the results above mentioned. After having calculated the quantity, as above mentioned, the operator should distill a trial-charge of ore and the saturating material or materials compounded according to the calculation.

If the results of the distillation show that the distilling-vessel has not been affected by corrosive action, and that the slag has the requisite fusibility, the quantity of saturating material, added to succeeding charges, may be reduced progressively until the corrosion of the distilling-vessel commences, which effect will show that the last charge treated contained too small a quantity of the saturating materials. If, on the other hand, the result of the distillation of the first trial-charge is that the distilling-vessel is corroded, an additional quantity of the saturating material should be added progressively to succeeding charges until the corrosive action ceases. The operator may, of course, prefer to employ a quantity of saturating material less than sufficient to prevent all traces of corrosive action rather than to reduce the zinc contents of the charge beyond a certain proportion; but in this event the invention will be used without attaining the full benefit that may be derived from it. If, however, upon distilling the trial-charge the residuum in the retort shows that the slag has not been readily fusible, then an additional quantity of silicious material should be incorporated progressively in succeeding charges until a slag of the requisite fusibility, as well as freedom from corrosive action, is produced.

In order that the invention may be fully understood, I will proceed to describe some examples of its practical application to the distillation of manganiferous zinc ores. In the first of these Franklinite was the ore to be treated, and had the following chemical composition, as determined by analysis, viz:

| | |
|---|---|
| Sesquioxide of iron | 60.95 |
| Sesquioxide of manganese | 17.98 |
| Oxide of zinc | 20.63 |
| Lime | .27 |
| Alumina | .54 |
| Silica | 2.03 |
| | 102.40 |

The silico-ferruginous material employed in the process was magnetic iron ore from Lake Champlain, containing eighty-five per cent. of magnetic oxide, the residue being mainly quartz, (silica,) with some pyrites of iron, phosphate of lime, and titanic acid. As Franklinite ore generally contains from four to five per cent. of lime, which is beneficial in rendering the slag more fusible, and as the above specimen was deficient in lime, it was deemed expedient to add some lime to the charge. Both ores were reduced to coarse powder, and were compounded so that the mixture to be charged into the retorts had the following composition, viz:

| | |
|---|---|
| Franklinite | 27.8 |
| Magnetic iron ore | 32.4 |
| Dry slaked lime | 4.6 |
| Anthracite-coal dust | 32.4 |
| Water | 2.8 |
| | 100.0 |

This mixture was charged into the retorts, and heated in the customary manner practiced for the dry distillation of zinc ores; the heat being sufficient to cause the zinc to distil over freely, but not too fast for complete condensation. The yield in metallic zinc was 66.42 per cent. of the amount present in the mixture. The residuum in the retort consisted of slag, intermixed with globules and irregular masses of an alloy or compound of iron manganese and carbon, together with various impurities derived from the ores and from the ashes of the coal. The slag contained 40.48 per cent. of silica and 13.67 per cent. of protoxide of manganese. The metallic compound or alloy contained 93.01 per cent. iron, 2.805 per cent. manganese. The same mixture of materials was distilled many times in the retorts without their exhibiting any sign of corrosion by the action of manganese.

In the foregoing example the ore of zinc contained but a small proportion of silica, which would hold but a small portion of the manganese; hence it became necessary to use a comparatively large quantity of the silico-ferruginous saturating material (magnetic iron ore) in the process of distillation, for the purpose of fixing the residue of the manganese, and of thereby preventing it from acting upon the material of the retorts. The same result might have been obtained by mixing the Franklinite with other ores of zinc containing a large proportion of silica, and with or without a smaller quantity of the iron ore, depending upon the quantity of the silicious zinc ore used.

The following example of the treatment of zinc ores containing a large quantity of silica is given as an illustration of a practical application of the invention to them. The zinc ores treated consisted of a mixture of the minerals, Franklinite, Willemite, and Rhodonite, the mixed ore having the following chemical composition, viz:

| | |
|---|---|
| Oxide of zinc | 40.00 |
| Sesquioxide of iron | 23.65 |
| Sesquioxide of manganese | 11.60 |
| Silica | 14.26 |
| Alumina | 1.11 |
| Lime | 5.20 |
| Carbonic acid | 4.78 |
| Phosphoric acid (trace) | .00 |
| | 100.60 |

In this case the corrosion of the retorts during the distillation was sufficiently prevented for practical purposes by treating the ore with only about one sixth of its weight of magnetic iron ore, containing 80 per cent. of oxide of iron and about 9 per cent. of silica, and with the required amount of carbonaceous matter, the mixture for distillation being compounded as follows, viz:

| | |
|---|---|
| Zinc ores | 48.00 |
| Magnetic iron ore | 8.75 |
| Anthracite coal-dust | 43.25 |
| | 100.00 |

In this example the silica of the zinc ores was capable of holding a portion of the manganese, and the ashes of the coal-dust took up another portion. Consequently the quantity of silico-ferruginous material required to take up the residue, and to thereby prevent the corrosion of the retorts, is less than was required in the case of the Franklinite hereinbefore mentioned.

As an instance of the employment of silica as a substitute for iron as the saturating material for the excess of manganese in manganiferous zinc ore, I may state that satisfactory results have been attained by compounding Franklinite with the roasted native silicate of zinc in such proportions that the silica in the charge (including that contained in the ashes of the anthracite-coal dust employed as the reducing-agent) was sufficient to form bisilicates with the earthy and metallic unreduced bases of the charge.

The above examples are sufficient to show that the invention is not restricted to precise proportions of the ingredients used, the characteristic features of the improved process of distillation being that practically enough saturating material (either ferruginous or silicious, or silicious and ferruginous) is added to the manganiferous zinc ore to combine with or hold whatever portion of the manganese would not be held by the components of the ore and of the ashes of the carbonaceous material during the process, and that there must be enough carbonaceous matter present to reduce the metallic compounds to the metallic state.

The choice of the particular ferruginous, silicious, or silico-ferruginous material to be employed depends upon circumstances, varying with the facility with which one or the other of the materials can be obtained, or their comparative cost, or the value of the products. If, for example, a silicious saturating material of good quality can be obtained at a low cost, and the compound or alloy of iron and manganese cannot be sold at a profit, it would be preferable to use the silicious in place of a ferruginous material. If, again, the zinc ores are rich in carbonate of lime, the use of a silicious or of a silico-ferruginous material rich in silica is expedient in preference to a pure ferruginous material alone, or to a silico-ferruginous material poor in silica, in order that the slag produced during the distillation may have the requisite fusibility.

If the silica can be obtained in the form of a silicious ore of zinc, and the cost does not preclude its use, it is expedient to employ it as the saturating material for the excess of manganese in the manganiferous zinc ore to be distilled, because the contents of zinc in the charge would be thereby increased.

The residuum obtained from the process of distillation may be stamped and washed to separate the metallic matter from the earthy matter; or the residuum may be ground in revolving drums, and then sifted and washed to effect the separation. The metallic matter may then be remelted, either with or without the addition of cast-iron, and may be cast into molds, so as to be salable for the purposes and uses to which similar alloys of iron and manganese are applied.

What I claim as my invention is—

The improvement in the art of distilling metallic zinc from its manganiferous ores, consisting of the treatment of the manganiferous zinc ore, supplementary saturating material, and carbonaceous matter simultaneously, in the distilling-vessel, by heat, substantially as before set forth.

Witness my hand this 4th day of October, A. D. 1875.

GIDEON E. MOORE.

Witnesses:
JAS. W. SMITH,
MATT. HINMAN.